March 9, 1937.  A. E. GILMAN  2,073,302
CORN SHELLER
Filed June 20, 1935
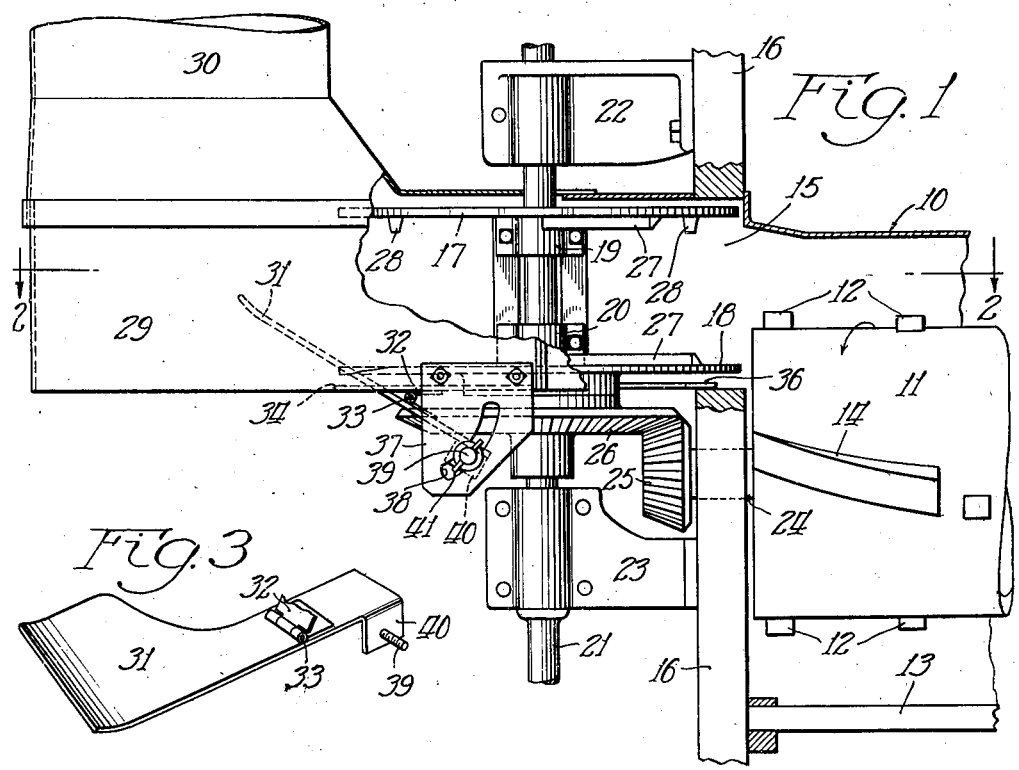
Inventor:
Albert E. Gilman
By John Howard McElroy(?)
his Atty Patented Mar. 9, 1937

2,073,302

UNITED STATES PATENT OFFICE 2,073,302

CORN SHELLER

Albert E. Gilman, Ottawa, Ill., assignor to King & Hamilton Company, Ottawa, Ill., a corporation of Illinois Application June 20, 1935, Serial No. 27,553

6 Claims. (Cl. 130—6)

My invention is concerned with corn shellers of the type shown in the Gilman Patent No. 1,018,820, dated February 27, 1912, and is designed to secure a better separation of the cobs and husks than was possible with the structure shown in the aforesaid patent.

It consists essentially in the addition of a deflecting plate, preferably adjustable, and located where the cobs and husks are discharged from the cylinder and concave after the corn has been shelled therefrom, and is designed to direct the cobs and husks up into the entrance to the suction trunk, whence the husks are carried away by suction, and the cobs are allowed to drop into the cob conveyor.

To illustrate my invention, I annex hereto a sheet of drawing in which the same reference characters are used to designate identical parts in all the figures, of which,—

Fig. 1 is a side elevation of one end of a corn sheller containing my invention, with a portion of the side thereof broken away;

Fig. 2 is a top plan view in section on the line 2—2 of Fig. 1; and

Fig. 3 is a detached perspective view of the deflecting plate.

In the past, when corn was husked by hand and a small portion, if any, of the husk was left on each ear of corn, the construction shown in my aforesaid Patent No. 1,614,921 was entirely adequate to secure the desired separation of the cobs and husks. In recent years mechanical corn pickers have come into use by which the ears of corn are picked without removing substantially any of the husks, and the ears fed into the sheller carry with them all the husks which makes the problem of separating the cobs therefrom much more difficult. Without the deflecting plate some of the increased mass of husks that have to be handled tend to fall down with the cobs if the suction is not materially increased, and if that is done it becomes strong enough to carry some of the cobs upward with the husks and past the bend in the suction trunk where they cannot drop back and down onto the customary cob conveyor located directly beneath the bottom 29 of the trunk. In order to secure the desired capacity, the shaft 21 must rotate at a speed of approximately 300 revolutions per minute, and the centrifugal action of the disk 18 on the cobs and husks throws them violently, horizontally against the bottom 29 to its detriment and to a point where the suction has little opportunity to separate them, since it can only be effective within the trunk. With the deflecting plate added and adjusted as shown in Fig. 1, the cobs and husks are thrown violently, not horizontally, but upward to a substantial angle so that they hit the suction trunk well above its bottom portion with two beneficial results. In the first place, the cobs striking the trunk 30 at a different angle do not hit it so effectively, and bounce upwardly therefrom. Without the deflecting plate, they bounce directly back horizontally and meet the falling cobs and husks with the result that they fall down immediately and there is very little space in which the full force of the suction can act to separate the cobs and husks. With the deflecting plate guiding the cobs upwardly, and they rebounding upwardly there is a very considerable distance through which the cobs must fall in the trunk and be subject to the full effects of the suction for all that distance, with the result that by employing my deflecting plate in the novel combination shown I secure a practically perfect separation of the cobs and husks under the difficult conditions met in modern corn shelling practice. By making the angle of the plate adjustable, I can secure the desired perfection of separation under the different conditions and kinds of corn that may be met with.

The ears of corn, usually with some of the husks attached, are fed into a hopper (not shown), whence they fall into the concave 10, in which the shelling cylinder 11 rotates and the cylinder teeth 12 of which, co-operating with the bars 13, shell the grains from the cobs, the grain falling through the spaces between the bars 13 on to a screen or riddle (not shown), where it is cleaned. My Patent No. 1,614,921, dated January 18, 1927, may be referred to as showing substantially a complete sheller of this type and its mode of operation. The cobs and husks are carried from the hopper through the length of the cylinder by the feeding wings 14 to the outlet aperture 15 in the end 16 of the machine, where they are caught between the disks 17 and 18 secured by their hubs 19 and 20 on the vertical shaft 21 suitably journaled in bearings 22 and 23 supported from the end 16 and driven from the cylinder shaft 24 through the medium of the pinion 25 and the bevel gear 26 secured on the shaft 21 below the disk 18. The disks 17 and 18 have on their opposed faces the substantially radially arranged ribs 27 and pins 28 which insure the cobs and husks which fall on the lower disk 18 from the outlet 15 being discharged tangentially from between the disks into the bottom 29 of the suction trunk 30 constituting part of the customary wind stacker by which the husks are blown to any desired location.

To lessen the possibility of the separated husks adhering to or being caught between the cobs and merely falling off of the edge of the disk 18 without being strongly subjected to the upward draft through the trunk 30, I locate the deflecting plate 31 (seen in side elevation, top plan view, and detached in perspective, in Figs. 1, 2 and 3, respectively) adjacent the edge of the disk 18, where the cobs would otherwise drop off, and incline its delivery end upward so that the cobs and husks are necessarily carried upward into and well toward the center of the bottom 29 of the trunk 30, where the strong upward draft of air will naturally catch and carry upward the lighter husks, while permitting the cobs to fall by gravity into the cob conveyor (not shown).

To secure the most effective operation of this deflecting plate, I preferably make it adjustable by pivoting it by the hinge 32 upon the under side of the substantially semiannular plate 34 secured at its ends to the inner lower edges of the sheet-metal bottom 29 of the suction trunk, which end is secured to the intermediate section 35, which in turn is secured to the end 16 of the sheller. A similarly-shaped complementary piece 36 to the plate 34 and secured to the section 35 completes an annular shield between the edges of the disk 18 and the gear 26. A vertical plate 37 secured at its upper edge to the outside of the bottom 29 of the trunk 30 has the arcuate slot 38 therein centered on the hinge pin 33 so that the bolt 39 carried by the vertical tail 40 on the lower end of the deflecting plate 31 and extending through the slot 38 may by means of its wing nut 41 be used to secure the deflecting plate 31 in whatever position may be found experimentally to be most efficient for the particular material being handled by the sheller.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a corn sheller the combination with a cylinder and concave, of a suction trunk, a moving conveyor between the suction trunk inlet and the concave outlet receiving the cobs and husks directly at the outlet and throwing them to the trunk inlet, and a stationary deflecting plate between the conveyor and the trunk inlet having an upwardly inclined surface against which the cobs and husks are thrown to be deflected upwardly into the trunk against the attraction of gravity.

2. A corn sheller as described in claim 1 in which there is means for adjusting the angle of the plate relative to the suction trunk to determine how far up into the latter the cobs shall be delivered.

3. In a corn sheller, the combination with a cylinder and concave, of a suction trunk, a conveyor between the concave outlet and the suction trunk inlet rotating on a vertical axis and directly receiving the cobs and husks, and a stationary deflecting plate having its edge adjacent where the centrifugal action of the conveyor discharges the cobs and husks curved to bring it into close cooperation relative thereto, the plate serving to direct them upwardly into the trunk against the attraction of gravity and at an angle that causes the cobs to rebound upwardly from the interior of the trunk.

4. A corn sheller as described in claim 3 in which the deflecting plate is fulcrumed to the suction trunk and has a bolt projecting from its lower end through an arcuate slot in the suction trunk and a nut cooperating with the bolt.

5. In a corn sheller, the combination with a cylinder and concave, of a suction trunk with its inlet portion extending at right angles to the horizontal, mechanism rotating at a high speed located directly at the outlet of the concave and receiving the cobs and husks and hurling them tangentially toward the distant wall of the trunk, and deflecting means between said mechanism and the bottom of the trunk to change the direction of the tangential movement upwardly toward the outlet of the trunk, the cobs after striking said distant wall being free to fall directly downward through the air inlet of the trunk.

6. A corn sheller as described in claim 5 in which the deflecting means consists of a plate positioned between the rotating mechanism and the distant wall and having a receiving surface inclined upwardly.

ALBERT E. GILMAN.